US010638540B2

(12) United States Patent
Guven et al.

(10) Patent No.: US 10,638,540 B2
(45) Date of Patent: Apr. 28, 2020

(54) EMERGENCY CALL SETUP IN WIRELESS NETWORKS

(71) Applicant: T-Mobile USA, Inc., Bellevue, WA (US)

(72) Inventors: Mesut Guven, Woodinville, WA (US); Ming Shan Kwok, Seattle, WA (US); Hsin-Fu Henry Chiang, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/862,888

(22) Filed: Jan. 5, 2018

(65) Prior Publication Data

US 2018/0192470 A1   Jul. 5, 2018

Related U.S. Application Data

(63) Continuation of application No. 15/395,719, filed on Dec. 30, 2016, now Pat. No. 9,867,217.

(51) Int. Cl.
*H04W 76/50* (2018.01)
*H04W 48/18* (2009.01)
(Continued)

(52) U.S. Cl.
CPC .......... *H04W 76/50* (2018.02); *H04L 65/608* (2013.01); *H04M 3/42357* (2013.01);
(Continued)

(58) Field of Classification Search
CPC ..... H04W 76/50; H04W 76/40; H04W 76/18; H04W 4/90; H04W 4/02; H04W 28/24;
(Continued)

(56) References Cited

U.S. PATENT DOCUMENTS 7,991,381 B1 * 8/2011 Dunne .................... B60R 25/00
379/33
8,160,000 B2 * 4/2012 Balasubramanian, Sr. ..................
H04L 12/12
370/328
(Continued)

FOREIGN PATENT DOCUMENTS

WO    WO2016057685    4/2016

OTHER PUBLICATIONS

PCT Search Report and Written Opinion dated Mar. 30, 2018 for PCT Application No. PCT/US17/66007, 17 pages.
(Continued)

*Primary Examiner* — Nathan A Mitchell
(74) *Attorney, Agent, or Firm* — Lee & Hayes, P.C.

(57) ABSTRACT

The systems, devices, and techniques described herein are directed to scheduling wireless communications and verifying connections, for example, in an emergency call context. An emergency call scheduler can be installed in an application layer of user equipment to manage call scheduling. During an emergency situation, the emergency call scheduler can attempt to establish a communication based on a priority of network technologies (e.g., LTE, 4G, 3G, 2G) or a base station being in a subscriber network. As a call is established, a connection may be verified based at least in part on satisfying one or more handshake protocols and based at least in part on transmitting or receiving voice and/or data packets. Based on a location of the user equipment, or as a network topology is updated, a centralized server can update the emergency call scheduler to change the call scheduling priority.

20 Claims, 6 Drawing Sheets

(51) Int. Cl.
*H04L 29/06* (2006.01)
*H04M 3/42* (2006.01)
*H04W 28/24* (2009.01)
*H04W 76/18* (2018.01)
*H04W 4/90* (2018.01)
*H04W 4/029* (2018.01)
*H04W 76/40* (2018.01)
*H04W 88/06* (2009.01)

(52) U.S. Cl.
CPC ............ *H04W 4/029* (2018.02); *H04W 4/90* (2018.02); *H04W 28/24* (2013.01); *H04W 48/18* (2013.01); *H04W 76/18* (2018.02); *H04W 76/40* (2018.02); *H04M 2207/18* (2013.01); *H04M 2242/04* (2013.01); *H04W 88/06* (2013.01)

(58) Field of Classification Search
CPC .... H04W 48/18; H04W 88/06; H04L 65/608; H04M 3/42357; H04M 2207/18; H04M 2242/04
See application file for complete search history.

(56) References Cited

U.S. PATENT DOCUMENTS

| | | | |
|---|---|---|---|
| 9,351,140 B2 | 5/2016 | Vick et al. | |
| 2007/0032219 A1* | 2/2007 | Rudolf | H04W 76/50 455/404.1 |
| 2007/0123208 A1* | 5/2007 | Batta | H04W 72/10 455/404.1 |
| 2007/0135089 A1* | 6/2007 | Edge | H04W 64/00 455/404.1 |
| 2007/0142028 A1* | 6/2007 | Ayoub | H04M 3/5116 455/404.1 |
| 2008/0001733 A1* | 1/2008 | Pinder | H04M 1/72541 340/539.18 |
| 2008/0009262 A1* | 1/2008 | Rudolf | H04W 4/90 455/404.1 |
| 2008/0016556 A1* | 1/2008 | Selignan | H04W 4/90 726/7 |
| 2008/0161032 A1* | 7/2008 | Xue | H04W 84/08 455/520 |
| 2008/0200142 A1* | 8/2008 | Abdel-Kader | H04M 1/72536 455/404.2 |
| 2009/0042538 A1* | 2/2009 | Cho | H04L 12/66 455/406 |
| 2009/0264094 A1* | 10/2009 | Smith | G08B 25/016 455/404.2 |
| 2010/0080174 A1* | 4/2010 | Zhu | H04W 48/18 370/328 |
| 2010/0113010 A1* | 5/2010 | Tenny | H04L 12/66 455/423 |
| 2011/0014892 A1* | 1/2011 | Hedman | H04W 4/90 455/404.2 |
| 2012/0134345 A1* | 5/2012 | Tamhankar | H04W 4/22 370/338 |
| 2012/0178407 A1* | 7/2012 | Rudolf | H04W 4/90 455/404.1 |
| 2013/0059560 A1 | 3/2013 | Ray et al. | |
| 2013/0064176 A1* | 3/2013 | Hsu | H04W 4/02 370/328 |
| 2013/0078940 A1* | 3/2013 | Patil | H04W 76/50 455/404.1 |
| 2014/0128017 A1* | 5/2014 | Han | H04W 4/90 455/404.1 |
| 2014/0274179 A1* | 9/2014 | Zhu | H04W 52/243 455/509 |
| 2014/0323146 A1* | 10/2014 | Stenfelt | H04L 41/0893 455/456.1 |
| 2014/0355587 A1 | 12/2014 | Tanaka et al. | |
| 2015/0245388 A1* | 8/2015 | Yerrabommanahalli | H04W 4/90 455/404.1 |
| 2015/0254248 A1* | 9/2015 | Burns | H04L 67/16 707/749 |
| 2015/0304983 A1 | 10/2015 | Krening et al. | |
| 2015/0334618 A1* | 11/2015 | Gillett | H04W 48/04 370/338 |
| 2015/0351021 A1* | 12/2015 | Zhang | H04W 48/18 455/432.1 |
| 2016/0192251 A1* | 6/2016 | Chebolu | H04W 36/0088 455/404.1 |
| 2016/0337831 A1 | 11/2016 | Piett et al. | |
| 2016/0374103 A1* | 12/2016 | Sanka | H04W 48/18 |
| 2018/0192264 A1 | 7/2018 | Kwok et al. | |

OTHER PUBLICATIONS

PCT Search Report and Written Opinion dated Apr. 10, 2018 for PCT Application No. PCT/US17/66320, 13 pages.
Office Action for U.S. Appl. No. 15/395,334, dated Apr. 30, 2018, Kwok, "Open Access Points for Emergency Calls", 24 pages.
Office action for U.S. Appl. No. 15/395,719, dated Aug. 4, 2017, Guven et al., "Emergency Call Setup in Wireless Networks ", 21 pages.
Office Action for U.S. Appl. No. 15/395,334, dated Sep. 28, 2018, Kwok et al, "Open Access Points for Emergency Calls", 29 pages.
Office Action for U.S. Appl. No. 15/395,334, dated Apr. 2, 2019, Kwok, "Open Access Points for Emergency Calls", 34 pages.

\* cited by examiner

EMERGENCY CALL SETUP IN WIRELESS NETWORKS

CROSS REFERENCE TO RELATED APPLICATIONS

This application is a continuation of, and claims priority under 35 U.S.C. § 120 to, U.S. patent application Ser. No. 15/395,719, filed Dec. 30, 2016, of the same title, which is incorporated herein by reference.

BACKGROUND

Modern telecommunication systems include heterogeneous mixtures of second, third, and fourth generation (2G, 3G, and 4G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies.

In most cases, wireless devices may initiate an emergency call on any wireless network using any access technology, regardless of whether the wireless device is a subscriber to particular wireless network or telecommunication system. However, network factors such as quality, reliability, and location accuracy vary amongst networks. In an emergency situation, network connectivity can be critical.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
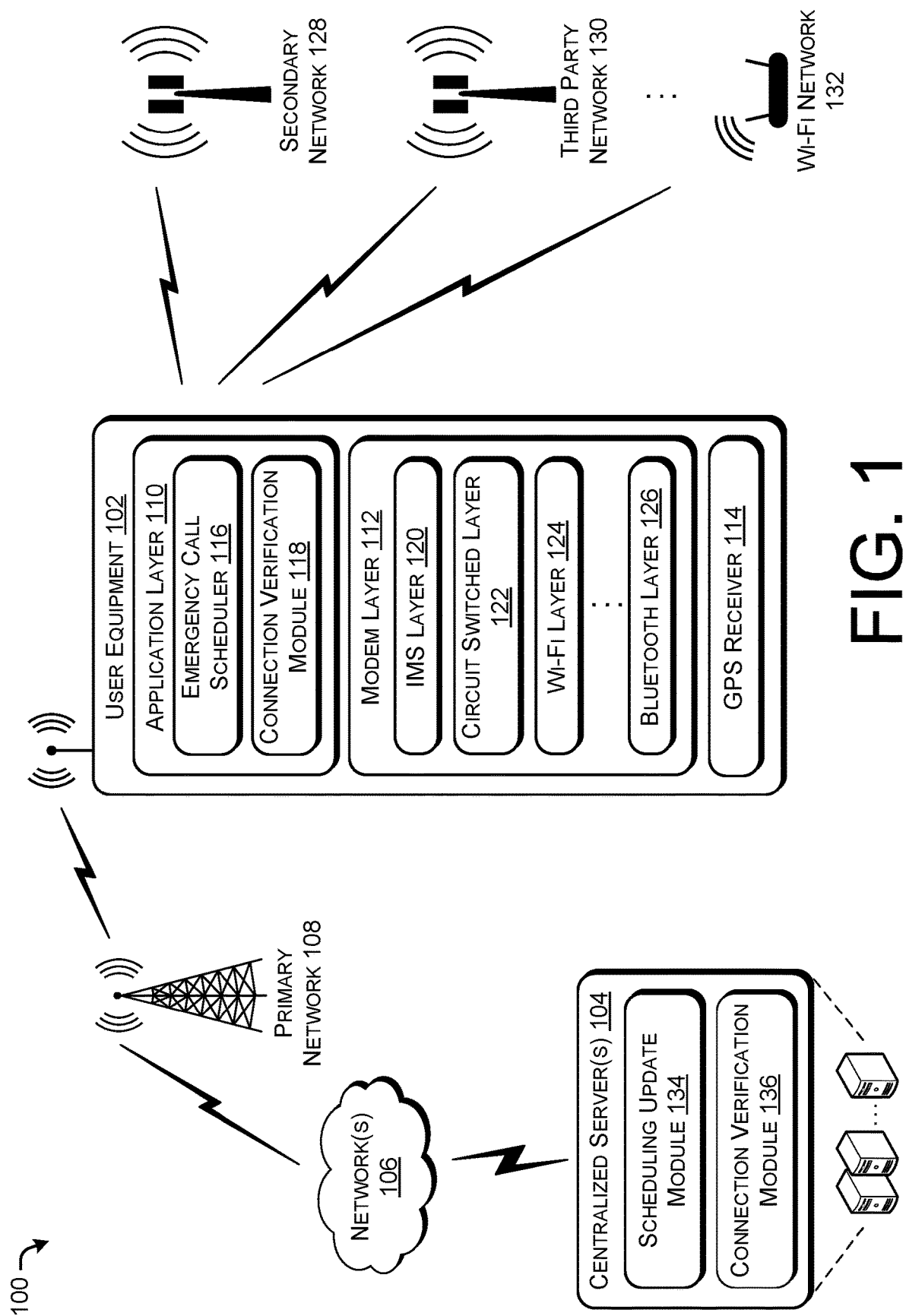
FIG. 1 illustrates an example environment for emergency call setup using an emergency call scheduler.

The systems, devices, and techniques described herein are directed to scheduling wireless communications and verifying connections, for example, in an emergency call context. In some instances, an emergency call scheduler can be installed in an application layer of user equipment to manage call scheduling for the user equipment. During an emergency situation, the emergency call scheduler can attempt to establish a communication based on a priority of network technologies. For example, the priority of network technologies may be based at least in part on a communication type (e.g., 4G, 3G, 2G), network provider status (e.g., subscriber relationships), location services, etc. As a call is established, a connection may be verified based at least in part on satisfying one or more handshake protocols and based at least in part on transmitting or receiving voice and/or data packets. In some instances, if a connection is not verified, the user equipment can follow a fault protocol to establish a communication according to the emergency call schedule. Based on a location of the user equipment, or as a network topology is updated, a centralized server can update the emergency call scheduler to change the call scheduling priority.

In this manner, the systems, devices, and techniques described herein improve a functioning of a computing device by facilitating a network communication. For example, the emergency call scheduler can attempt to establish a connection using all network resources that are available according to the priority of the schedule. In some instances, the emergency call scheduler can establish a plurality of connections in parallel and select a connection for the emergency call based on a Quality of Service (QoS) of the connection. A connection can be verified to facilitate transmission of voice and/or data packets, and can prevent a situation where devices are connected to a network but are not facilitating a communication. By providing a wireless communication in emergency situations, emergency responders can be deployed at critical times.

Further, providing the emergency call scheduling and call verification in an application layer of a user equipment allows centralized server (e.g., a network carrier or service provider) to update a priority of calls or call scheduling at any time, following manufacturing of the user equipment. Further, providing the functionality in an application layer, in contrast to hard-coded by OEM (original equipment manufacturer) allows a centralized server to update or optimize any user equipment for any network topology. These and other improvements to the functioning of a network are discussed herein.

The systems, devices, and techniques described herein can be implemented in a number of ways. Although aspects of this disclosure may be discussed in context of an emergency call (e.g., a call that is directed to or is routed through a public-safety answering point (PSAP)), the disclosure applies to other wireless communications as well, and is not intended to be limited to one particular context. Example implementations are provided below with reference to the following figures.

FIG. 1 illustrates an example environment 100 for emergency call setup using an emergency call scheduler. In some instances, the environment 100 can include user equipment 102 (e.g., a smartphone) that communicates with one or more centralized servers 104 via one or more networks 106. In some instances, the user equipment 102 may communicate with the centralized server(s) 104 (or other user equipment or devices) via a primary network 108. For example, the primary network 108 may be a network that the user equipment 102 is associated with (e.g., by contract or subscription), such that the primary network 108 is a default network for communications with the user equipment 102.

The user equipment 102 may include an application layer 110, a modem layer 112, and a Global Positioning System (GPS) receiver 114. Further, the application layer 110 may include an emergency call scheduler 116 and a connection verification module 118. The modem layer 112 may include an Internet Protocol (IP) Multimedia System (IMS) layer 120, a circuit switched layer 122, a Wi-Fi layer 124, and a Bluetooth layer 126. In some instances, when an emergency call is placed at the user equipment 102, the emergency call scheduler 116 can determine which of the modem layers 112 to initiate the call, and/or can determine which network to use for an emergency communication.

For example, the emergency call scheduler 116 may attempt to initiate a communication using the primary network 108. If the primary network is not available, for example, the emergency call scheduler 116 may attempt to establish a network connection using a secondary network 128, a third-party network 130, a Wi-Fi network 132, etc. In some instances, the emergency call scheduler 116 may control an operation of the modem layer 112 to select an order of network selection (e.g., using a first priority network, second priority network, third priority, etc.), and may control a timeout period (e.g., to switch from one network to another after a period of time attempting to establish a communication), a number of retries, etc. For example, in attempting to establish an emergency call, the emergency call scheduler 116 may attempt to establish a communication with a primary network 108, and if a connection is not established within the timeout period (e.g., 5 seconds, 10 seconds, 15 seconds, etc.), the emergency call scheduler 116 may retry or may attempt to establish a communication with a secondary network 128. In some instances, a priority of a network can be temporarily adjusted based on a previous attempt to establish a connection with the network.

In some instances, the emergency call scheduler 116 may attempt to establish a connection with a plurality of networks in parallel. For example, the emergency call scheduler 116 may attempt to establish a connection using the primary network 108, the secondary network 128, the third-party network 130, and the Wi-Fi network 132 at a same time. Upon establishing a connection with one or more of the networks, 108, 128, 130, and/or 132, the emergency call scheduler 116 can evaluate a Quality of Service (QoS) of the connection and may terminate one or more connections that are below a QoS threshold, for example. In some instances, one or more connections may be maintained based on a QoS of the connection being above a threshold, and/or a RTP packet being transmitted and/or received by the user equipment 102.

In some instances, the emergency call scheduler 116 may select a network (or a base station specific to a network) based on a variety of factors, including but not limited to location of the user equipment, availability of networks, Quality of Service (QoS) (e.g., signal strength, delay, congestion, reliability, etc.), time of day, network provider (e.g., wireless carrier) associated with the user equipment 102, roaming contract, number of retries, etc. In some instances, the emergency call scheduler 116 may determine to use a third-party network 130, for example, when the primary network 108 or the secondary network 128 is available but when a connection quality of the third-party network 130 is better, for example, based upon relative signal strengths (e.g., received signal strength indications (RSSIs)), congestion, delay, etc.

In some instances, the connection verification module 118 may operate in conjunction with the emergency call scheduler 116 to verify a connection to confirm that a call has been established, or that a call has failed. Based on whether a connection has been confirmed, the emergency call scheduler 116 may continue attempting to establish a communication, in accordance with the priority of networks, for example. In some instances, the connection verification module 118 may verify that a connection protocol (e.g., a handshake procedure) has been satisfied. In addition to establishing a connection (e.g., using the signaling layer or control layer), the connection verification module 118 may determine whether voice and/or data packets have been exchanged at the user equipment 102. Such additional verification may prevent a situation where a connection is made between the user equipment 102 and the networks 106, 108, 128, 130, and 132, but no communication is being provided. Thus, the connection verification module 118 may quickly determine whether a connection is facilitating a communication. Additional aspects of the connection verification module 118 are provided in connection with FIG. 5, below.

In some instances, the primary network 108 may be a default network associated with the user equipment 102, based on a contract or subscription. In some instances, the primary network 108 may be a Voice over Long-Term Evolution (VoLTE) network associated with a first network provider. In some instances, the user equipment 102 may communicate via the primary network 108 using the IMS layer 120 under control of the emergency call scheduler 116.

In some instances, the secondary network 128 can include a network, such as a circuit switched network, operated by the first network provider. In some instances, the secondary network 128 may be associated with the user equipment 102, based on a contract or a subscription with the first network provider. In some instances, the secondary network 128 may include a 2G or 3G connection, which may facilitate communication with the user equipment 102 via the circuit switched layer 122 of the modem layer 112.

In some instances, the primary network 108 and/or the secondary network 128 may provide a guaranteed Quality of Service (QoS) to the user equipment 102 in accordance with a contract or subscription between the user equipment 102 and the first network provider.

In some instances, the third-party network 130 may include a network operated by a second network provider different than the first network provider. In some instances, the second network provider may be associated with the first network provider via a contractual relationship (e.g., to provide roaming coverage to the user equipment), and in some instances, the second network provider may be unrelated or unassociated with the first network provider. In some instances, the third-party network 130 may include 2G, 3G, or 4G technology. In some instances, the third-party network 130 does not provide a guaranteed Quality of Service (QoS) to the user equipment 102 when the user equipment 102 is communicating via the third-party network 130.

In some instances, the Wi-Fi network 132 may include a Wi-Fi network, such as one provided in home or office of a user. Additional networks may include satellite networks, Bluetooth networks, etc., that facilitate wireless communication. In some instances, the Wi-Fi layer 124 of the user equipment 102 may facilitate communication with the Wi-Fi network 132. In some instances, the Bluetooth layer 126 may facilitate communication with a Bluetooth network, for example.

In some instances, the emergency call scheduler 118 may operate to determine a location of the user equipment 102 via the GPS receiver 114 and provide an indication of the location when facilitating an emergency call. For example, when the user equipment 102 is communicating with the Wi-Fi network 132, the emergency call scheduler 116 may control the GPS receiver 114 to determine a location of the user equipment 102 and provide that location with other voice and/or data packets. In some instances, the emergency call scheduler 116 may provide an indication of some or all networks detectable by the user equipment 102 to further determine a location of the user equipment 102.

The centralized server(s) 104 may include a scheduling update module 134 and a connection verification module 136. In some instances, the scheduling update module 134 can determine a schedule which can be transmitted to the user equipment 102 for implementing the dynamic scheduling operations discussed herein. For example, the scheduling update module 134 can maintain a network topology of primary and second networks (e.g., networks 108 and 128) which can instruct the user equipment 102 to select when attempting an emergency call. In some instances, the scheduling update module 134 can provide an updated schedule to the emergency call scheduler 116 based on an upgrade to the network or based on receiving an indication of a location of the user equipment 102. For example, if the user equipment 102 is activated (or powered on, or operated) in a first location (e.g., the United States) a first emergency call schedule can be provided to the user equipment 102, while if the user equipment 102 is activated (or powered on, or operated) in a second location (e.g., Australia) a second emergency call schedule can be provided to the user equipment 102.

Further, as mentioned above, in some instances, the scheduling update module 134 may provide an updated schedule to the user equipment 102 in response to a change in network topology, such as the installation of additional network base stations. Also, the scheduling update module 134 can provide an updated schedule to the user equipment 102 based on call histories received from user equipment 102, discussed in connection with FIG. 3.

In some instance, the connection verification module 136 can include functionality to verify a connection with the user equipment 102. For example, the connection verification module 136 may detect or monitor a handshake protocol, for example (e.g., to determine that a traffic channel or bearer has been assigned to the user equipment 102). Further, the connection verification module 136 may detect transmission and/or reception of one or more voice or data packets associated with the user equipment 102. If, for example, the user equipment 102 has completed a handshake with the primary network 108 but no voice and/or data packets have been transmitted and/or received from the user equipment 102, the connection verification module 136 may initiate a re-registration procedure to facilitate communication for the user equipment 102. Additional aspects of the connection verification module 136 are provided in connection with FIG. 6, below.

Figure 2:
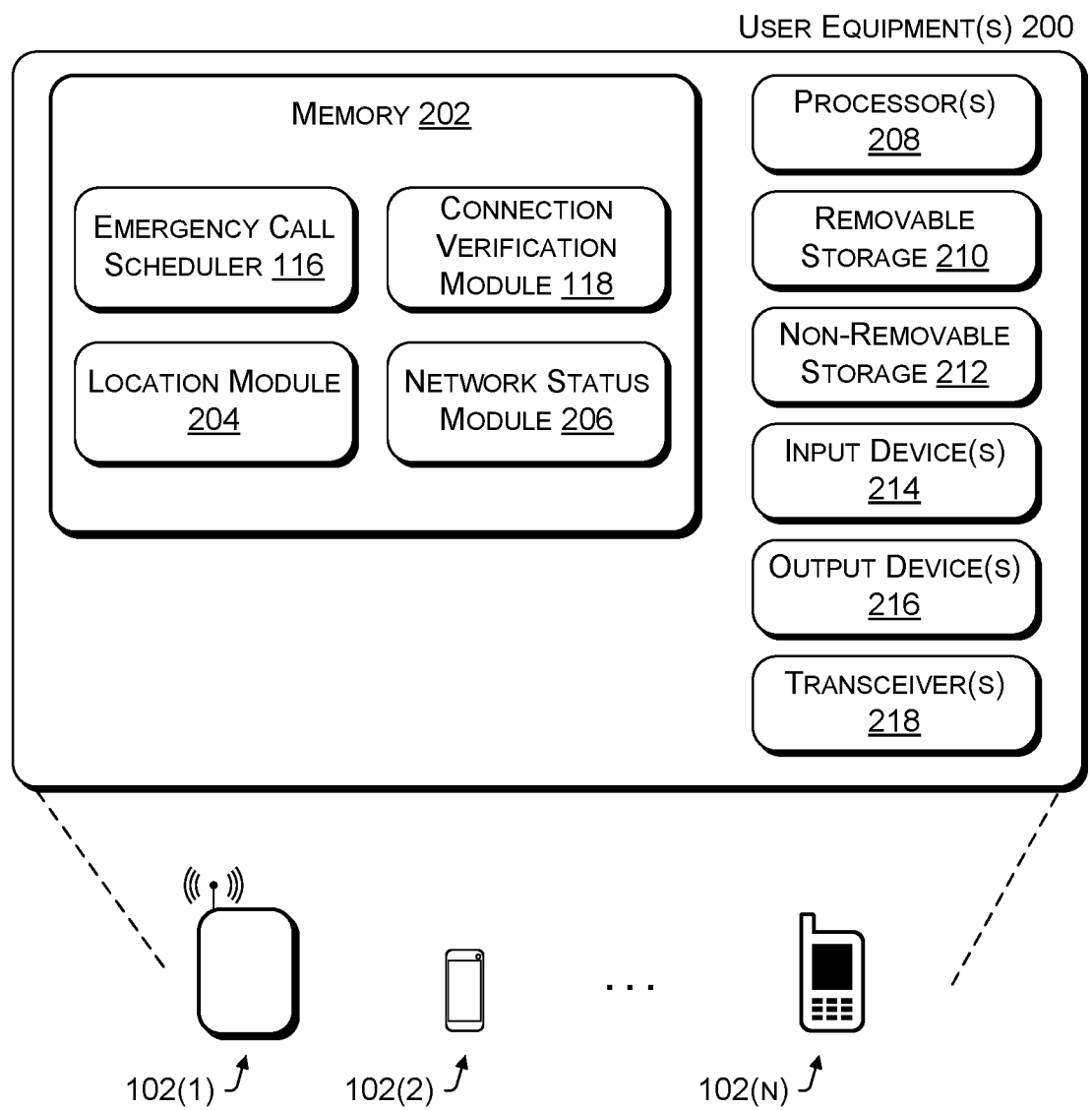
FIG. 2 illustrates an exemplary user equipment implementing the emergency call scheduling and verification of the present disclosure.

FIG. 2 illustrates an exemplary user equipment 200 implementing the emergency call scheduling and verification of the present disclosure. In some embodiments, the user equipment 200 can correspond to the user equipment 102 of FIG. 1, and may be used to implement the various operations described herein. As discussed herein, the user equipment 200 can be deployed in a variety of devices such as user equipment 102(1), 102(2), . . . 102(n). Further, the user equipment 200 can be implemented in any sort of device capable of engaging in wired or wireless communication with other, remote devices. Thus, the user equipment 200 can include, but are not limited to, servers, smart phones, mobile phones, cell phones, tablet computers, portable computers, laptop computers, personal digital assistants (PDAs), electronic book devices, or any other electronic devices that can generate, request, receive, transmit, or exchange voice, video, and/or digital data.

As illustrated, the base station 200 comprises a memory 202 storing the emergency call scheduler 116, the connection verification module 118, a location module 204, and a network status module 206. In some instances, the memory 202 may include the application layer 110 of FIG. 1. Further, aspects of the modem layer 112 may be implemented in the memory 202 and in other hardware of the user equipment 200. Also, the user equipment 200 includes processor(s) 208, a removable storage 210 and non-removable storage 212, input device(s) 214, output device(s) 216, and transceiver(s) 218.

In various embodiments, the memory 202 is volatile (such as RAM), non-volatile (such as ROM, flash memory, etc.) or some combination of the two. The emergency call scheduler 116, the connection verification module 118, the location module 204, and the network status module 206 stored in the memory 202 can comprise methods, threads, processes, applications or any other sort of executable instructions. The emergency call scheduler 116, the connection verification module 118, the location module 204, and the network status module 206 can also include files and databases.

Details of the emergency call scheduler 116 and the connection verification module 118 are provided above in the discussion of FIG. 1. As noted above, in some implementation, the emergency call scheduler 116 can timeout, retry (redial), or cycle through various communication protocols and/or networks to establish a communication for an emergency call. In some instances, the emergency call scheduler 116 can stop retrying or redialing after a period of time or after a number of attempts and provide an indication of network availability (e.g., success or failure) to a user. In some instances, the emergency call scheduler 116 can cease attempting to establish a communication, but may initiate a communication or provide an indication to a user regarding availability of a network when a network is available.

In some instances, the emergency call scheduler 116 can include a timer to adjust a priority of one or more networks in the emergency call scheduler 116. For example, upon dialing an emergency call via a first network, the emergency call scheduler 116 can begin a timer associated with the first network. In some instances, the timer can count down from (or up to) a predetermined time, such as 2 minutes, 1 minute, 30 seconds, etc. If the connection with the first network is not established and/or verified within the time period associated with the timer, a priority of the first network can be temporarily reduced. Thus, when attempting to establish a connection for a second time, the priority of the first network will be reduced, and the emergency call scheduler 116 can attempt to initiate the connection with a second network.

In some embodiments, the location module 204 can include functionality to determine a location of the user equipment 200. For example, the location module 202 can receive location information from the GPS receiver 114 included in the user equipment 200. In some instances, the location module 204 can determine a location of the user equipment based on reception of a plurality of signals having known originating positions (e.g., positions of base stations) to triangulate a location of the user equipment 200. In some instances, the location module 204 can transmit a location of the user equipment 200 to one or more base stations, in conjunction with scheduling an emergency call. In some instances, the location module 204 can store locations of the user equipment 200 and provide locations when service is available at a later time.

In some embodiments, the network status module 206 can include functionality to determine a Quality of Service (QoS) of any one of the networks 108, 128, 130, and/or 132.

For example, the network status module 206 can determine a strength or quality of a signal, which may be used in determining which network to schedule when initiating an emergency call. In some instances, a selection of a network may be based solely on a priority of the networks determined by the emergency call scheduler 116. In some instances, a selection of a network may be based on a status of the networks provided by the network status module 206. For example, a network QoS may be used as a factor in determining which network to use. By way of example and without limitation, in an event where the primary network 108 and the secondary network 128 are not available, the emergency call scheduler 116 may initiate an emergency call on the third-party network 130 or the Wi-Fi network 132. If a QoS of the networks 130 or 132 are the same or within a threshold level, the emergency call scheduler 116 may select the third-party network 130 as a next network to attempt a connection. However, if the QoS of the Wi-Fi network is higher than the QoS of the third-party network 130 (or a difference between the QoS is above a threshold), the emergency call scheduler 116 may select the Wi-Fi network 132 before selecting the third-party network 130 to initiate the emergency call.

Further, the network status module 206 can monitor a status of one or more available network connections continuously, at regular or irregular intervals, or may determine a QoS of all available networks prior to initiating an emergency call. Thus, in some instances, a selection of a network or priority order of initiating calls by the emergency call scheduler can be based at least in part on a network status provided by the network status module 206.

In some embodiments, the processor(s) 208 is one or more central processing units (CPUs), graphics processing units (GPUs), or both CPU and GPU, or other processing units or components known in the art.

The user equipment 200 also includes additional data storage devices (removable and/or non-removable) such as, for example, magnetic disks, optical disks, or tape. Such additional storage is illustrated in FIG. 2 by removable storage 201 and non-removable storage 212. Tangible computer-readable media can include volatile and nonvolatile, removable and non-removable media implemented in any method or technology for storage of information, such as computer readable instructions, data structures, program modules, or other data. Memory 202, removable storage 210 and non-removable storage 212 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the user equipment 200. Any such tangible computer-readable media can be part of the user equipment 200.

The user equipment 200 can include input device(s) 214, such as a keypad, a cursor control, a touch-sensitive display, image sensors, etc. Also, the user equipment 200 can include output device(s) 216, such as a display, speakers, etc. These devices are well known in the art and need not be discussed at length here.

As illustrated in FIG. 2, the user equipment 200 can include one or more wired or wireless transceiver(s) 218. In some wireless embodiments, to increase throughput, the transceiver(s) 218 can utilize multiple-input/multiple-output (MIMO) technology. The transceiver(s) 218 can be any sort of wireless transceivers capable of engaging in wireless, radio frequency (RF) communication. For example, the transceiver(s) 218 can implement one or more technologies including 2G, 3G, 4G, LTE, Bluetooth, Bluetooth Low Energy, LoRaWi-Fi, WirelessHD, WiGig, Z-Wave, Zigbee, AM/FM, RFID, NFC, satellite radio, satellite phone, etc. Thus, the transceiver(s) 218 can implement GSM, UMTS, and/or LTE/LTE Advanced telecommunications technologies using terrestrial or satellite transceivers.

Figure 3:
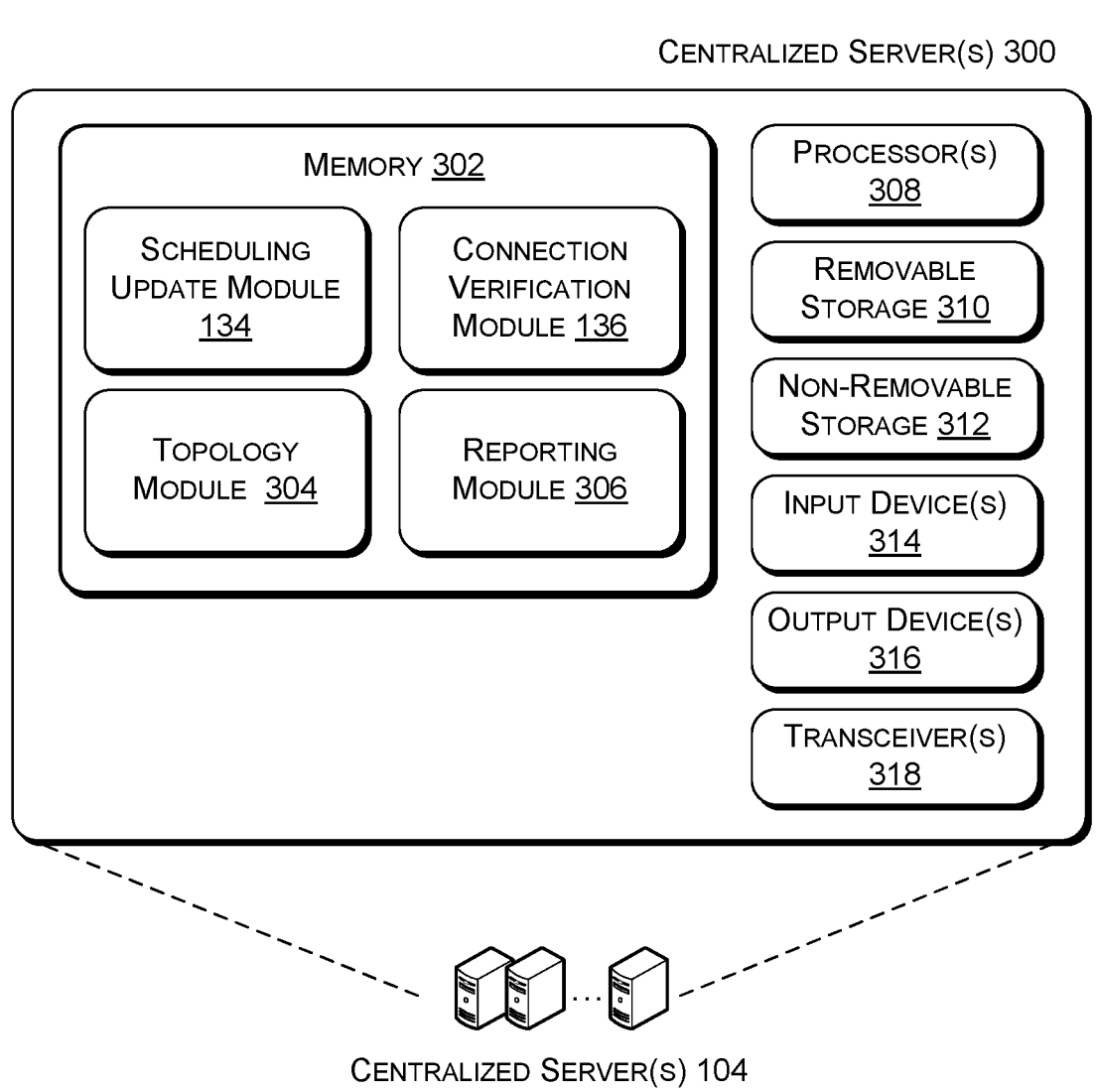
FIG. 3 illustrates an exemplary centralized server configured to provide an updated emergency scheduler for user equipment.

FIG. 3 illustrates an exemplary centralized server 300 configured to provide an updated emergency scheduler for user equipment. In some embodiments, the centralized server 300 can correspond to the centralized server 104 of FIG. 1, and may be used to implement the various operations described herein. It is to be understood in the context of this disclosure that the centralized server 300 can be implemented as a single device or as a plurality of devices with modules and data distributed among them. For example, the centralized server may include memory 302 storing the scheduling update module 134, the connection verification module 136, a topology module 304, and a reporting module 306 to provide scheduling and confirmation for emergency calls, as described herein. Also, the centralized server 300 includes processor(s) 308, a removable storage 310 and non-removable storage 312, input device(s) 314, output device(s) 316, and transceiver(s) 318.

In various embodiments, memory 302 is volatile (such as RAM), non-volatile (such as ROM, flash memory, etc.) or some combination of the two. The scheduling update module 134, the connection verification module 136, the topology module 304, and the reporting module 306 stored in the memory 302 can comprise methods, threads, processes, applications or any other sort of executable instructions. The scheduling update module 134, the connection verification module 136, the topology module 304, and the reporting module 306 can also include files and databases.

Details of the scheduling update module 134 and the connection verification module 136 are provided above in the discussion of FIG. 1.

In some embodiments, the topology module 304 can include functionality to monitor or catalog base station devices installed in particular locations to provide wireless service. Thus, upon receiving a location of a user equipment (e.g., upon initialization or power-on), the topology module 304 can determine a mix of primary networks and/or secondary networks installed in a location, and can provide that topology to the scheduling update module 134 to provide a priority schedule to a user equipment.

In some embodiments, the reporting module 306 can provide functionality to receive reports and/or historical call data of emergency calls from user equipment to optimize the emergency call priority scheduling. For example, after each emergency call is placed, user equipment can provide a log of all activity associated with the emergency call, including location of the user equipment (or whether location information was available or not available), QoS of network(s), call flows (e.g., order of initiating a communication with networks, timeouts, retries, success/failure of connections, etc.) to the centralized server 300. The reporting module 306 can receive and aggregate the activity logs to determine an optimal call schedule/priority to increase a probability of connecting an emergency call and to increase a probability that the connection will be successful (e.g., to facilitate a communication).

In some embodiments, the one or more processor(s) 308 are central processing units (CPUs), graphics processing units (GPUs), or both CPU and GPU, or other processing units or components known in the art.

The centralized server 300 also includes additional data storage devices (removable and/or non-removable) such as, for example, magnetic disks, optical disks, or tape. Such additional storage is illustrated in FIG. 3 by removable storage 310 and non-removable storage 312. Tangible computer-readable media can include volatile and nonvolatile, removable and non-removable media implemented in any method or technology for storage of information, such as computer readable instructions, data structures, program modules, or other data. Memory 302, removable storage 310 and non-removable storage 312 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the centralized server 300. Any such tangible computer-readable media can be part of the centralized server 300.

The centralized server 300 also can include input device(s) 314, such as a keypad, a cursor control, a touch-sensitive display, voice input device, etc., and output device(s) 316 such as a display, speakers, printers, etc. These devices are well known in the art and need not be discussed at length here.

As illustrated in FIG. 3, the centralized server 300 also includes one or more wired or wireless transceiver(s) 318. For example, the transceiver(s) 318 can include a network interface card (NIC), a network adapter, a LAN adapter, or a physical, virtual, or logical address to connect to the user equipment 102 or 200, for example. To increase throughput when exchanging wireless data, the transceivers 318 can utilize multiple-input/multiple-output (MIMO) technology. The transceiver(s) 318 can comprise any sort of wireless transceivers capable of engaging in wireless, radio frequency (RF) communication. The transceivers 318 can also include other wireless modems, such as a modem for engaging in Wi-Fi, WiMax, Bluetooth, or infrared communication.

Figure 4:
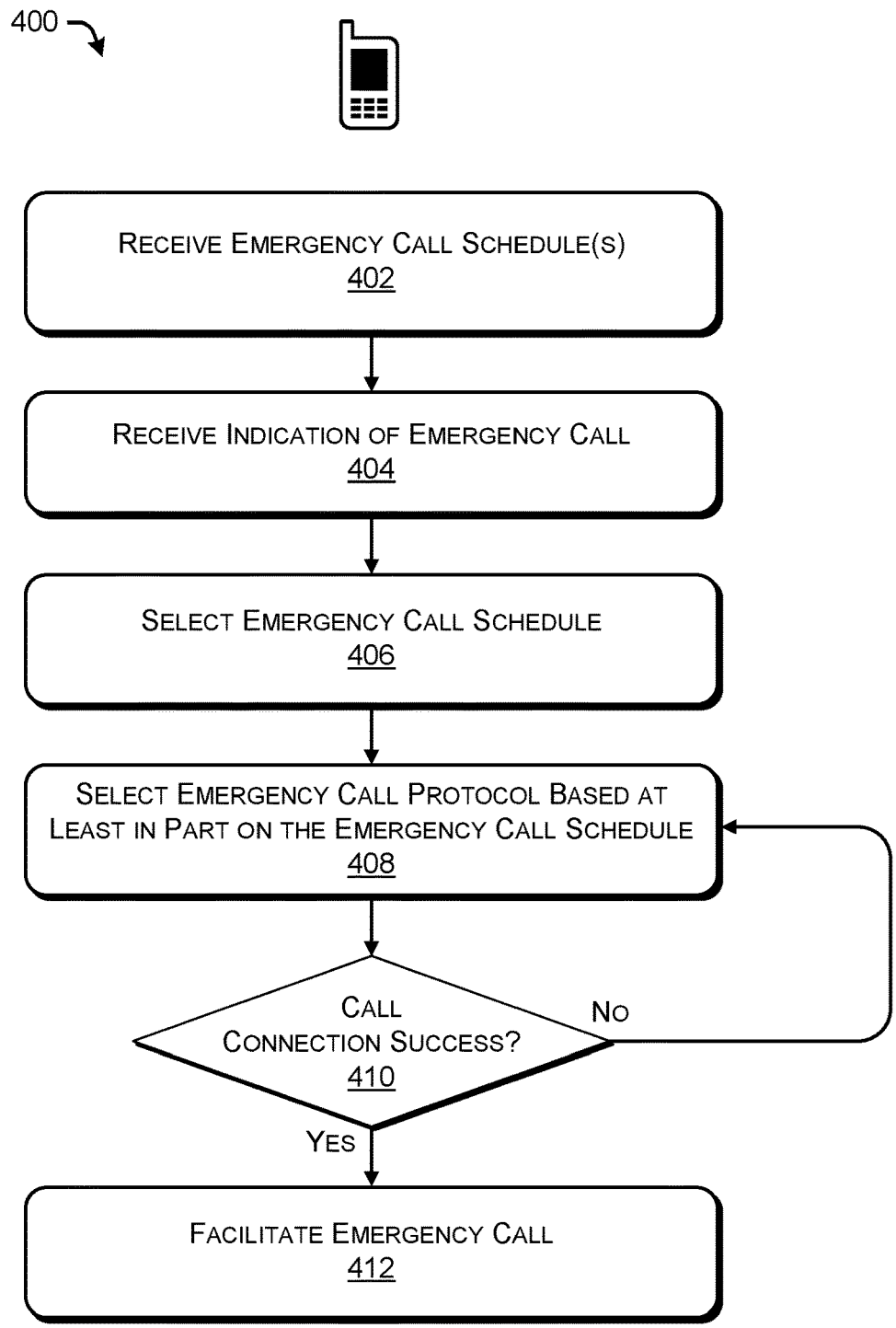
FIG. 4 illustrates an example process for implementing an emergency call scheduler on user equipment.
Figure 5:
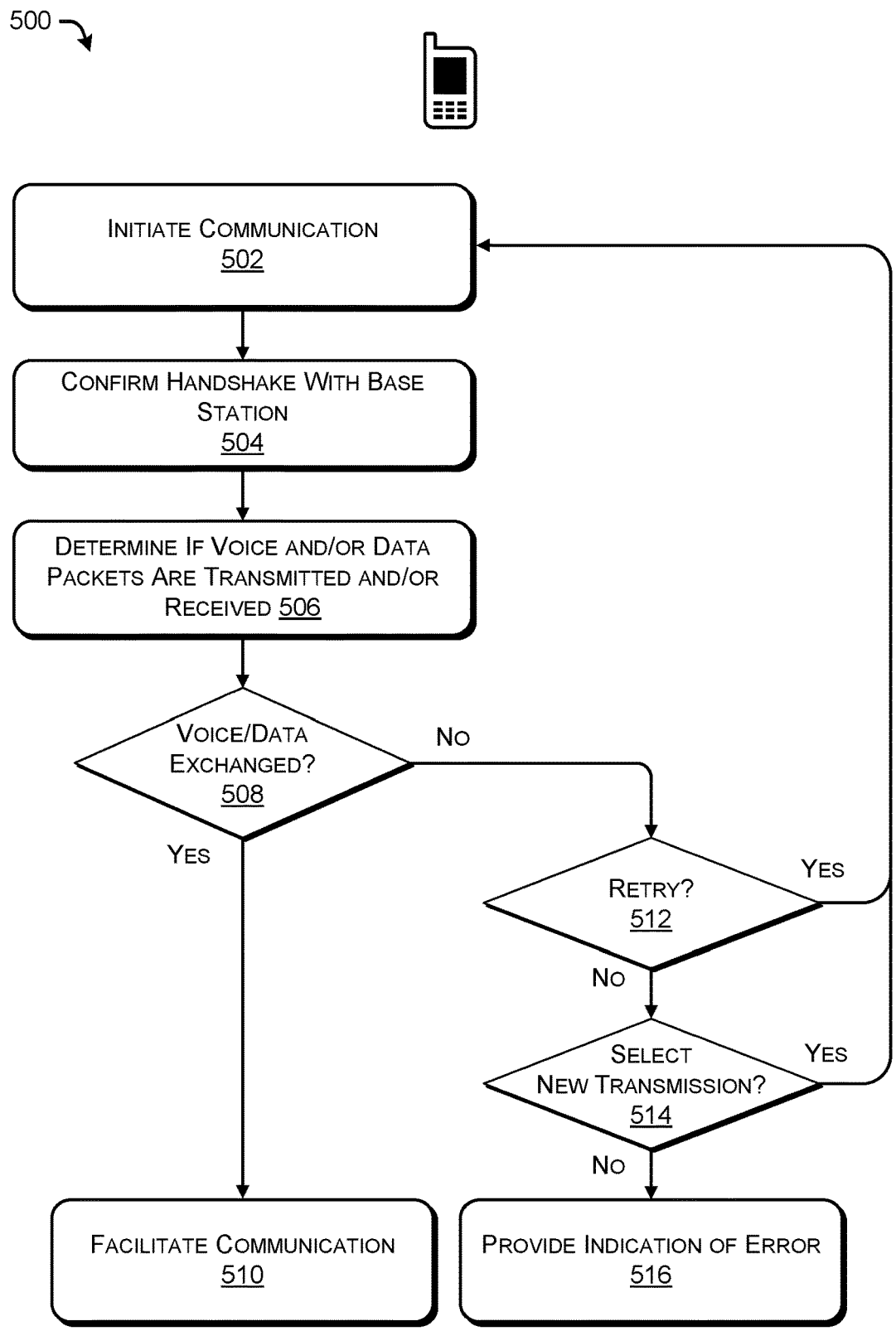
FIG. 5 illustrates an example process for verifying a connection at user equipment for a wireless communication.
Figure 6:
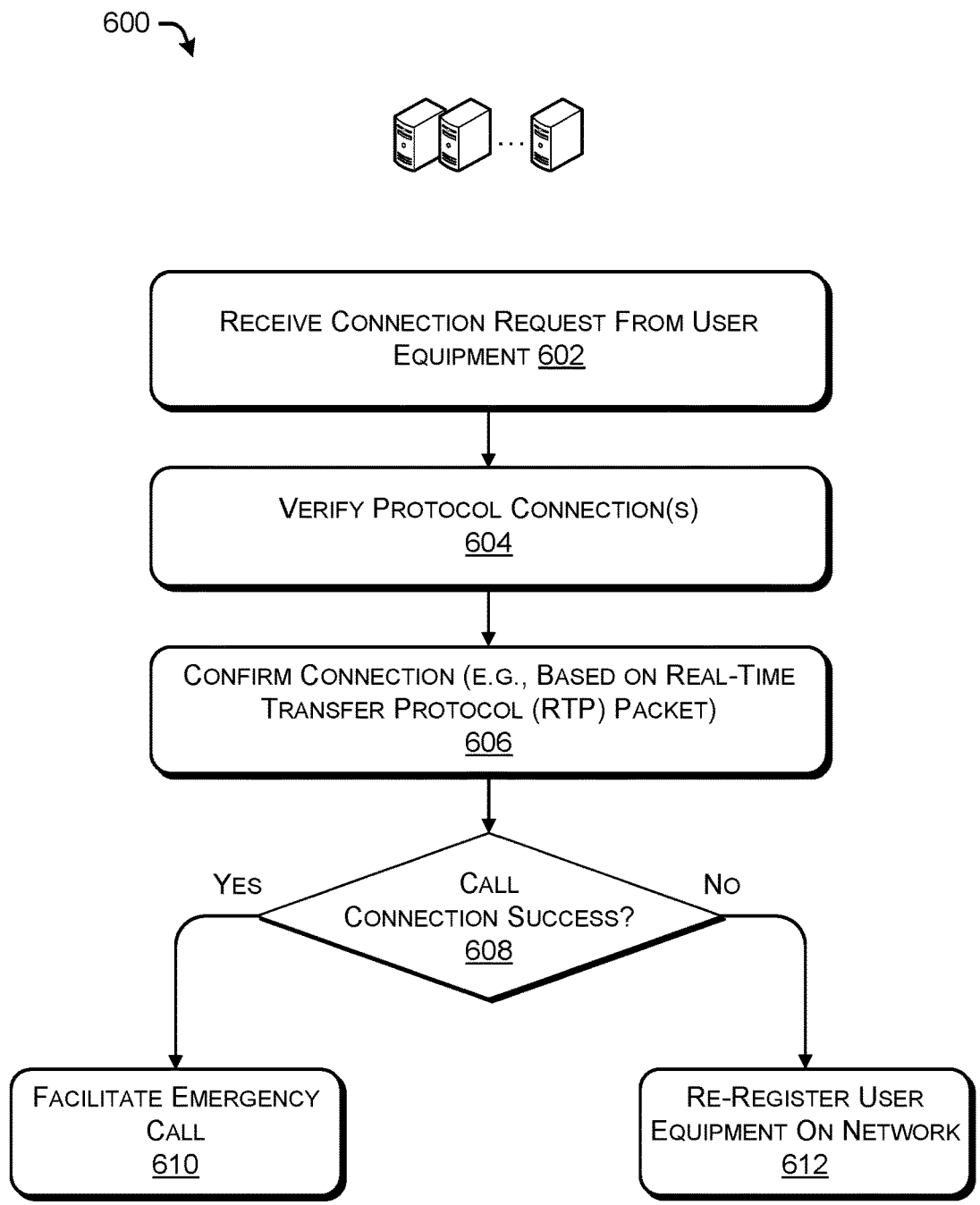
FIG. 6 illustrates an example process for verifying a connection at a centralized server for wireless communication.

FIGS. 4-6 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 illustrates an example process 400 for implementing an emergency call scheduler on user equipment. The example process 400 can be performed by a user equipment (e.g., the user equipment 102 or 200), for example. Further, some or all of the process 400 can be performed by one or more components in the environment 100.

At 402, the operation can include receiving one or more emergency call schedules. For example, a user equipment (e.g., the user equipment 102 or 200) can receive an emergency call schedule from a centralized server (e.g., the centralized server 104 or 300) based upon a request from the user equipment (e.g., in response to activation or powering on the device in a particular location). In some instances, the user equipment can determine that a current emergency call schedule stored in the user device is out of date or not configured for the location of the user equipment, and may request and/or receive an emergency call schedule in response.

At 404, the operation can include receiving an indication of an emergency call. In some instances, this operation can include receiving a telephone number (e.g., 911) from a user to call an emergency service. In some instances, the indication may be received via a touch screen of the user equipment.

At 406, the operation may include selecting an emergency call schedule. For example, the operation may include determining a location of the user equipment, and selecting an emergency call schedule based on that location. In some instances, the operation may include selecting a default emergency schedule.

At 408, the operation may include selecting an emergency call protocol based at least in part on the emergency call schedule. For example, the operation 408 may include selecting a primary network (e.g., the primary network 108) as the selected call protocol and attempting to initiate a connection with that network. In some instances, the operation 408 may include determining or tracking network status (e.g., QoS of the networks), a number of call attempts, a timeout period, etc. associated with the emergency call.

At 410, the operation may include determining whether a call connection is a success. For example, the operation 410 may include determining whether a handshake protocol has been completed (e.g., request and acknowledgement received from a base station), whether a traffic channel or bearer has been assigned, etc. Further, the operation 410 may include determining whether one or more voice and/or data packets has been transmitted from or received at the user equipment. For example, the operation 410 can determine if a real-time transport protocol (RTP) packet has been transmitted from the user equipment, and whether an acknowledgement of that packet has been received. In some instances, the operation 410 can include determining a QoS of the connection and determining if the QoS is above a QoS threshold. Further, the operation 408 may include determining or tracking a timeout period, a number of retries for a particular protocol, etc., in determining whether the connection is successful.

If a call connection is not successful ("no" in operation 410), the operation may return to the operation 408. In such a case, the operation may retry a selected protocol, or may select a new protocol based at least in part on the emergency call schedule. If the call connection is successful ("yes" in operation 410), the operation may continue to the operation 412. In some instances, a call connection may be considered not successful if the QoS associated with the connection is below a threshold.

At 412, the operation may include facilitating an emergency call. In some instances, the operation may include gathering and storing a call activity log associated with the emergency call (e.g., call flows, attempts, successes, duration, network conditions, etc.) to provide to a centralized server for updating the emergency call schedule, as described herein. In some instances, the operation 412 may include utilizing one or more sensors of the user equipment to provide a location of the user equipment to a network provider in conjunction with the emergency call.

FIG. 5 illustrates an example process 500 for verifying a connection at user equipment for a wireless communication. The example process 500 can be performed by a user equipment (e.g., the user equipment 102 or 200), for example. Further, some or all of the process 500 can be performed by one or more components in the environment 100.

At 502, the operation can include initiating a communication, such as an emergency call, at a user equipment (e.g., the user equipment 102 or 200). In some instances, the operation 502 may include receiving a telephone number via a touch screen or input device of the user equipment. In some instances, the operation 502 may include receiving a voice command, performing voice recognition on the voice command, identifying an address, and initiating communication to that address. In some instances, the operation 502 may include selecting a network or base station to initiate a communication, for example, in connection with a call scheduler or call priority, or in connection with an emergency call scheduler.

At 504, the operation can include confirming a handshake with a base station. In some instances, the operation 504 can include transmitting a request for a communication channel, and receiving a traffic channel assignment or a bearer assignment. In some instances, the handshake confirmed in the operation 504 can be particular to a communication protocol, such as LTE, 4G, 3G, 2G, etc.

At 506, the operation can include determining if voice and/or data packets are transmitted and/or received at the user equipment. For example, the operation may include transmitting a voice packet to a base station and receiving an acknowledgement that the packet has been received. In some instances, the operation may include receiving a voice packet at the user equipment and providing an acknowledgement to the sender of the packet.

At 508, if the voice/data packets are exchanged ("yes", operation 508, for example, based on the operation 506), the operation continues to the operation 510, which includes facilitating the communication.

If voice/data packets are not exchanged ("no", operation 508) despite the handshake being confirmed in the operation 504, the operation may continue to the operation 512. At 512, the operation can include determining whether to retry establishing a connection with a particular base station. In some instances, the operation 512 can track a number of attempts to establish a connection and/or an amount of time spent setting up a communication channel with the base station. In some instances, the operation 512 can determine if the operation has timed out (e.g., based on timer or time threshold for one or more operations of the process 500). If the operation 512 determines to retry ("yes", operation 512), the process can return to the operation 502 to initiate a communication with a base station using a particular protocol.

If the operation 512 determines not to retry ("no", operation 512) based at least in part on a number of retries or a time out period, the operation may proceed to the operation 514.

At 514, the operation can include selecting a new transmission, such as a new transmission protocol (e.g., LTE, 4G, 3G, 2G, etc.), a new base station or network (e.g., networks 108, 128, 130, 132), network carrier or provider, etc. For example, a new transmission can be selected based on an emergency call scheduler, and/or any priority or rankings of call flow, Quality of Service, etc. If a new transmission is to be selected ("yes", operation 514), the process returns to the operation 502 to initiate a new communication. If a new transmission is not to be selected ("no", operation 514), for example, based on a number of retries, time out period, availability of networks, Quality of Service, device characteristics (e.g., battery of the user equipment), the operation may continue to 516.

At 516, the operation can include providing an indication of an error. For example, the operation 516 can include providing an audio, visual, and/or haptic feedback via the user equipment to inform a user that the emergency call cannot be completed. In some instances, the operation 516 can include updating an activity log to provide to a centralized server upon reconnecting to a network.

FIG. 6 illustrates an example process 600 for verifying a connection at a centralized server for wireless communication. The example process 600 can be performed by a centralized server (e.g., the centralized server 104 or 300), for example. Further, some or all of the process 600 can be performed by one or more components in the environment 100.

At 602, the operation can include receiving a connection request from user equipment (e.g., the user equipment 102 or 200). In some instances, the connection request may be an emergency call placed at a user device and received at a centralized server (e.g., the centralized server 104 or 300).

At 604, the operation can include verifying one or more protocol connections. For example, the user equipment may be registered in the IMS system to receive communication. Further, the operation 604 may include receiving a request for a traffic channel assignment, and allocating a traffic channel to the user equipment.

At 606, the operation can include confirming a connection, for example, based on receiving or transmitting a real-time transfer protocol (RTP) packet with the user equipment.

At 608, the operation can include determining, based at least in part on the success of the operations 604 and 606, whether a call connection is a success. In some instances, a call connection can be considered a success when a connection is established between a user equipment and a network base station, and an RTP packet is exchanged, indicating that voice or data traffic is exchanged.

If the call connection is a success ("yes", operation 608), the operation proceeds to operation 610, which includes facilitating a call, such as an emergency call.

If the call connection is not a success ("no", operation 608), the operation can proceed to operation 612, which may include re-registering the user equipment on the network. In some instances, the operation 612 may include providing an instruction to the user equipment to initiate or re-initiate the communication with a same network or a different network. Thus, the process 600 can be used to quickly determine a status of a connection and remedy the connection, thereby providing connectivity to user equipment in accordance with embodiments of the disclosure.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A device comprising:
one or more processors; and
a memory storing computer-executable instructions that, when executed by the one or more processors, cause the one or more processors to perform operations comprising:
  receiving at least one emergency call schedule, the at least one emergency call schedule including:
    a priority of one or more communication protocols, the priority including scheduling, in an order, the one or more communication protocols, the one or more communication protocols including at least a first priority communication protocol and a second priority communication protocol, and
    a call flow for initiating an emergency call based at least in part on the priority of the one or more communication protocols;
  receiving a request to initiate the emergency call;
  selecting a first handshake protocol associated with the first priority communication protocol based at least in part on the at least one emergency call schedule;
  initiating a first communication using the first handshake protocol of the first priority communication protocol;
  determining that the first communication failed;
  selecting a second handshake protocol associated with the second priority communication protocol based at least in part on the at least one emergency call schedule;
  initiating a second communication using the second handshake protocol of the second priority communication protocol; and
  receiving an updated emergency call schedule based at least in part on an updated network topology.

2. The device of claim 1, the operations further comprising:
determining that the second communication is a success based at least in part on determining that a traffic channel has been assigned to the device.

3. The device of claim 1, wherein determining that the first communication has failed comprises:
determining that the device has completed a handshake with the first handshake protocol; and
determining that at least one of a voice packet or a data packet has not been transmitted to the device.

4. The device of claim 1, wherein the first priority communication protocol is associated with a first network provider and is at least one of a fourth-generation (4G) communication protocol or a Long-Term Evolution (LTE) communication protocol, and the second priority communication protocol is associated with the first network provider and is at least one of a second-generation (2G) communication protocol or a third-generation (3G) communication protocol.

5. The device of claim 1, the operations further comprising:
determining a location of the device;
transmitting the location of the device to a centralized server; and
receiving the at least one emergency call schedule based at least in part on the location of the device.

6. A device comprising:
one or more processors; and
a memory storing computer-executable instructions that, when executed by the one or more processors, cause the one or more processors to perform operations comprising:
  receiving at least one emergency call schedule, the at least one emergency call schedule including a priority of communication protocols for initiating an emergency communication, the priority including scheduling, in an order, at least a first priority communication protocol and a second priority communication protocol;
  initiating a communication using the first priority communication protocol, the first priority communication protocol based at least in part on the at least one emergency call schedule;
  determining that at least one of a traffic channel or bearer has been assigned to the device;
  determining that the communication is a success based at least in part on transmission of at least one of one voice packet or one data packet to the device; and
  receiving an updated emergency call schedule based at least in part on an update associated with a network topology.

7. The device of claim 6, wherein the at least one emergency call schedule indicates the priority of the communication protocols based at least in part on a contractual relationship associated with the device;
wherein the first priority communication protocol is associated with a first network provider with the contractual relationship associated with the device; and
wherein the second priority communication protocol is associated with a second network that is at least one of unrelated or unassociated with the device.

8. The device of claim 6, wherein the at least one emergency call schedule indicates the priority of the communication protocols based at least in part on a Quality of Service (QoS) associated with individual protocols of the communication protocols; and
wherein a first QoS associated with the first priority communication protocol is higher than a second QoS associated with the second priority communication protocol.

9. The device of claim 6, wherein the at least one emergency call schedule includes a first emergency call schedule associated with a first location and a second emergency call schedule associated with a second location, the operations further comprising:
determining that the device is located in the first location; and
selecting the first emergency call schedule in response to the determining that the device is located in the first location.

10. The device of claim 9, wherein the updated emergency call schedule comprises a first update emergency call schedule and the operations further comprising receiving a second updated emergency call schedule based at least in part on an update associated with a location of the device.

11. The device of claim 6, wherein:
the first priority communication protocol is associated with a first network provider, the first priority communication protocol including at least one of a fourth-generation (4G) protocol or a Long-Term Evolution (LTE) protocol;
the second priority communication protocol is associated with the first network provider, the second priority communication protocol including at least one of a second-generation (2G) protocol or a third-generation (3G) protocol; and wherein the at least one emergency call schedule further includes a third priority communication protocol associated with a second network provider that is different than the first network provider.

12. The device of claim 6, wherein the at least one emergency call schedule indicates at least a timeout period and a number of retries to be attempted for an individual communication protocol of the communication protocols.

13. A processor-implemented method comprising:
receiving an emergency call schedule including a priority of communication protocols for initiating an emergency communication, the priority including scheduling, in an order, at least a first priority communication protocol and a second priority communication protocol;
storing the emergency call schedule in an application layer of a wireless device, wherein the emergency call schedule is configured to control at least a portion of a modem layer of the wireless device to:
receive a request to initiate an emergency call from an input of the wireless device;
initiate a first communication using the first priority communication protocol, the first priority communication protocol determined from the emergency call schedule;
determine that the first communication using the first priority communication protocol has failed;
reinitiate the first communication using the first priority communication protocol;
determine a number of times that the first communication has failed;
initiate a second communication using the second priority communication protocol, the second priority communication protocol determined from the emergency call schedule; and
receiving an updated emergency call schedule based at least in part on an updated network topology.

14. The processor-implemented method of claim 13, wherein determining that the first communication has failed is based at least in part on a failure to transmit at least one of a first voice packet or a first data packet from the wireless device or receive at least one of a second voice packet or a second data packet at the wireless device.

15. The processor-implemented method of claim 13, further comprising:
determining that a traffic channel has been assigned to the wireless device;
determining that a handshake protocol has been performed; and
determining that at least one real-time transport protocol (RTP) packet has been transmitted by the wireless device to a wireless base station associated with the second communication; and
determining that the second communication is a success.

16. The processor-implemented method of claim 13, wherein the emergency call schedule indicates at least a timeout period and a number of retries to be attempted for the first priority communication protocol prior to initiating the second communication using the second priority communication protocol.

17. The processor-implemented method of claim 13, wherein the emergency call schedule includes a first emergency call schedule associated with a first location and a second emergency call schedule associated with a second location, the processor-implemented method further comprising:
determining that the wireless device is located in the first location; and
selecting the first emergency call schedule in response to the determining that the wireless device is located in the first location.

18. The processor-implemented method of claim 13, wherein the emergency call schedule indicates the priority of the communication protocols based at least in part on a contractual relationship associated with the wireless device.

19. The device of claim 6, the operations further comprising initiating a second communication using the second priority communication protocol, wherein initiating the first communication and initiating the second communication are performed at substantially a same time period.

20. The device of claim 1, wherein the updated network topology comprises an installation of a network base station.

* * * * *